(12) United States Patent
Diquelou et al.

(10) Patent No.: US 11,362,963 B2
(45) Date of Patent: Jun. 14, 2022

(54) METHOD FOR MANAGING ALLOCATION REQUESTS TO ALLOCATE A COMPUTING RESOURCE

(71) Applicant: ORANGE, Issy-les-Moulineaux (FR)

(72) Inventors: Arnaud Diquelou, Chatillon (FR); Mathieu Rohon, Chatillon (FR); Jerome Gallard, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/123,608

(22) Filed: Dec. 16, 2020

(65) Prior Publication Data
US 2021/0194822 A1    Jun. 24, 2021

(30) Foreign Application Priority Data
Dec. 20, 2019    (FR) ...................................... 1915201

(51) Int. Cl.
| | |
|---|---|
| *G06F 15/173* | (2006.01) |
| *H04L 47/78* | (2022.01) |
| *H04L 45/42* | (2022.01) |
| *H04L 47/762* | (2022.01) |
| *H04L 47/80* | (2022.01) |
| *H04L 45/12* | (2022.01) |
| *H04L 67/63* | (2022.01) |
| *H04L 67/1001* | (2022.01) |
| *G06F 9/50* | (2006.01) |

(52) U.S. Cl.
CPC .......... *H04L 47/781* (2013.01); *G06F 9/5011* (2013.01); *H04L 45/12* (2013.01); *H04L 45/42* (2013.01); *H04L 47/762* (2013.01); *H04L 47/803* (2013.01); *H04L 67/1002* (2013.01); *H04L 67/327* (2013.01)

(58) Field of Classification Search
CPC ... H04L 47/781; H04L 47/762; H04L 47/803; H04L 45/42
See application file for complete search history.

(56) References Cited

U.S. PATENT DOCUMENTS

| | | | |
|---|---|---|---|
| 2016/0269308 A1* | 9/2016 | Lee | ..................... H04L 41/5012 |
| 2018/0302340 A1* | 10/2018 | Alvarez Callau | ....... H04L 47/76 |
| 2021/0136004 A1* | 5/2021 | Herle | ..................... H04L 67/10 |

OTHER PUBLICATIONS

English translation of Written Opinion of the French Searching Authority dated Apr. 23, 2020 for corresponding French Application No. 1915201, filed Dec. 20, 2019.

(Continued)

*Primary Examiner* — Richard G Keehn
(74) *Attorney, Agent, or Firm* — David D. Brush; Westman, Champlin & Koehler, P.A.

(57) ABSTRACT

A method for managing an allocation request to allocate a computing resource in a cloud computing system having comprising at least two data centers connected to one another via a communication network, implemented by an access device allowing a terminal to access the communication network and which determine a routing path to a service address. The method includes: transmitting the request to a first data center; and if the computing resource is not available, retransmitting the request to an adjacent data center that is the following one in the routing path, the retransmission of the request being reiterated until either a data center responds that the resource is available or the request has been retransmitted to all of the data centers.

7 Claims, 2 Drawing Sheets

(56) References Cited

OTHER PUBLICATIONS

French Search Report dated Apr. 23, 2020 for corresponding French Application No. 1915201, filed Dec. 20, 2019.
Written Opinion of the French Searching Authority dated Apr. 23, 2020 for corresponding French Application No. 1915201, filed Dec. 20, 2019.
Hasan Ziafat et al., "A Hierarchical Structure for Optical Resource Allocation in Geographically Distributed Clouds", Future Generation Computer Systems, vol. 90, Aug. 23, 2018 (Aug. 23, 2018), pp. 539-568, XP055688649.
Rekha P.M. et al., "Cost Based Data Center Selection Policy for Large Scale Networks", 2014 International Conference on Computation of Power, Energy, Information and Communication (ICCOEIC), IEEE, Apr. 16, 2014 (Apr. 16, 2014), pp. 18-23, XP032654511.
Valarmathi R. et al., Differed Service Broker Scheduling for Data Centres in Cloud Environment, Computer Communications, Elsevire Science Publishers BV, Amsterdam, NL, vol. 146, Aug. 12, 2019 (Aug. 12, 2019), pp. 186-191, XP085798254.

\* cited by examiner

METHOD FOR MANAGING ALLOCATION REQUESTS TO ALLOCATE A COMPUTING RESOURCE

FIELD OF THE DISCLOSURE

The present invention relates to a method for managing allocation requests, in a cloud computing system, to allocate a computing resource from a terminal of a user.

It also relates to a device for managing allocation requests.

BACKGROUND OF THE DISCLOSURE

A "cloud" computing system, as it is known, comprises a set of remote computing devices connected to one another via a communication network, such as the Internet, providing users with access on demand to computing resources, such as a storage space, software, computing power, etc.

Generally speaking, cloud computing systems are organized, in accordance with a centralized model, into data centers or data processing centers, each data processing center hosting computing equipments or devices for providing services to users.

The data centers are managed by cloud service providers (CSP).

Cloud service providers mainly offer three categories of services, infrastructure as a service, known as IaaS, platform as a service, known as PaaS, and software as a service (SaaS). Infrastructure as a service or IaaS offers access to virtualized computing resources, such as virtual machines installed on servers in data centers. Platform as a service or PaaS offers in particular virtual resources such as virtual machines with an installed operating system, and software as a service or SaaS allows users to use software installed in data center servers.

Infrastructure as a service (IaaS) is intended in particular for businesses wishing to subcontract services to a cloud service provider rather than purchase computing infrastructures. Using the services offered by cloud service providers allows a business for example to adapt the computing resources that it requires on the basis of activity peaks of the business.

Cloud service providers may have a number of data centers, distributed in various geographical regions that are sometimes distant from one another, the data centers being accessible via a communication network, such as the Internet.

In general, when a client device subscribes to a service offer from a service provider, one of the data centers of the service provider manages the client account as well as access to the services for the client device. Furthermore, in conventional cloud systems, the services requested by this client device are provided by this data center. It is however possible for the client to select another data center to host a service.

The client device (or service user), such as a business client of the cloud service provider, accesses the services by connecting to the communication network via an access network. This access network is for example a mobile or landline telephony network of an operator or a private business network, for example of LAN (local area network) type.

The client device and the data center providing the service are very often distant from one another. Given this distance between the location of the user requesting the service and the location of the data center offering the service, the quality of service may not be satisfactory, in particular for computing resources requiring significant bandwidths, sometimes making it difficult or even impossible to access the services when latencies are high and/or the available bandwidth is low.

In this context, there is a need to improve the quality of the services provided by cloud service providers.

One existing solution for reducing latencies when using services is that of increasing the number of data centers of the cloud computing system so as to distribute the computing resources such that the user has nearby data centers. This type of cloud computing system is known as a distributed cloud computing system and makes it possible to reduce the distance between the user and the data center providing services.

In particular, in this type of solution, the cloud service provider adds data centers so as to reduce the distance between at least one of the additional data centers and the user.

Of course, the distance should be understood as a "network distance", that is to say that it is equivalent to the time necessary to route data between two points. Thus, if the distance between the client device and a first data center is less than the distance between the client device and a second data center, the data are routed more quickly to the first data center than to the second data center.

For example, a client device may be located in a first geographical region (such as a country) and subcontract services to a service provider having a data center located in a second geographical region. According to the decentralization solution presented above, the service provider may add data centers in the first geographical region where the client device is located, such that the distance between the client device and at least one of these data centers in the first geographical region is less than the distance between the client device and the data center located in the second geographical region.

In this type of cloud computing system, when the client device or terminal of the user requests allocation of a computing resource, a management device determines the data center that will provide the requested service, for example that will allocate the requested resource. This management device, on the basis of various criteria, selects the most appropriate data center to provide the requested service from among the set of data centers of the cloud computing system. The management device may be a management server, a device in a management server or in a data center. This decision may be made differently depending on the cloud computing systems. In some systems, the management device takes note of the status of the resources available in each data center, and on this basis selects the most appropriate data center on the basis of the requirements of the client request. In other systems, the management device does not address allocation requests to the various data centers, but itself selects the most appropriate data center to provide the requested service on the basis of predefined parameters.

However, the centralized management of resource allocation requests by a management device may be complex, especially when the number of data centers in the cloud computing system is high. Furthermore, the fact that the selection of a data center for allocating resources (or providing services) is centralized slows down the operations of allocating the requested computing resource.

SUMMARY

The invention proposes to improve this situation.

To this end, according to a first aspect, the invention targets a method for managing an allocation request to allocate a computing resource in a cloud computing system, said request being sent by a terminal of a user, said cloud system comprising at least two data centers connected to one another via a communication network, said management method being implemented by an access device allowing the terminal of the user to access said communication network via an access network and being configured so as to determine a routing path for routing the request to a predefined service address for the cloud computing system.

According to the invention, the management method comprises:

transmitting the allocation request, received from the terminal of the user, to a first data center; and if, according to a response indicating the availability of the computing resource, the computing resource is not available in the first data center, retransmitting the allocation request to an adjacent data center, this adjacent data center being the following data center in the routing path, the retransmission of the allocation request to an adjacent data center being reiterated until either a data center responds that the resource is available or the request has been retransmitted to all of the data centers on the routing path.

The request is thus first of all addressed to the first data center. If the computing resource is not available in this first data center, the request is retransmitted to the adjacent data center or following data center in the routing path established by the access device in order to obtain the requested service.

The allocation request to allocate the computing resource is therefore addressed progressively to the data centers on the routing path, starting from the first data center.

It will be noted that the data centers on the routing path are asked one by one until a positive response is obtained for allocating the resource or all of the data centers have been asked. If none of the data centers gives a response in favor of allocating the requested computing resource, the user is notified thereof.

The routing path is furthermore established by the access device in order to reach what is called a service address, this address being provided by the service provider for the cloud computing system.

As indicated above, the distance should be understood as a "network distance", that is to say that when an allocation request to allocate a resource is routed between the terminal of the user and the service address, using the routing path established by the access device, the data center closest to the terminal of the user corresponds to the data center receiving the routed request first.

By virtue of these features, the management of the allocation of the computing resource is more effective because the centralized determination of the data center that will provide the service in a distributed cloud computing system is avoided. The determination of the data center that will provide the service is thus simplified and is implemented more quickly and without burdening the network.

Furthermore, in the event of network congestion, the impact of the network congestion on the management of the allocation request is minimized.

In summary, the management of the allocation request to allocate the computing resource from the user terminal is thus optimized. This allows the computing resource to be allocated more quickly, and without otherwise overburdening the communication network. It will be noted that, in the case of the prior art for a distributed cloud computing system, in which a management device interrogates the data centers regarding their availability of the resource, not only is the management of the allocation request slower, but also additional data traffic is generated, thereby contributing to overburdening the communication network.

The advantages provided by the method according to the invention are even greater when the cloud system comprises a large number of data centers. Specifically, the complexity of centralized management of allocation requests to allocate resources increases when the number of data centers in the cloud computing system increases. The method proposed by the invention thus has even more benefits in these cloud computing systems containing a high number of data centers.

According to one feature, the first data center is the first data center in the determined routing path.

The first data center is thus the data center closest to the terminal of the user.

The allocation request is addressed first of all to the data center closest to the terminal of the user. If the computing resource is not available in this first data center or data center closest to the user, the request is retransmitted to the adjacent data center or following data center in the routing path established by the access device in order to obtain the requested service.

The allocation request to allocate the computing resource is therefore addressed progressively to the data centers on the routing path, starting from the data center closest to the user.

It will be noted that the data centers on the routing path are asked one by one until a positive response is obtained for allocating the resource or the data center furthest from the terminal of the user has been asked (or in other words all of the data centers have been asked). If none of the data centers gives a response in favor of allocating the requested computing resource, the user is notified thereof.

It will furthermore be noted that, in this embodiment, the data center receiving the routed request first corresponds to the data center closest to the terminal of the user. Thus, with the resource being allocated as close as possible to the terminal of the user, the quality of service is optimum.

According to one feature, if the computing resource is not available in a data center, the management method furthermore comprises receiving the response indicating the availability of the computing resource.

This response comes from the data center to which the allocation request was transmitted. Thus, first of all, the access device receives the response from the first data center on the routing path.

Thus, if the computing resource is not available in the first data center, the first data center responds to the access device in order to inform it thereof. In the opposite case, that is to say if the computing resource is available, the resource allocation process ends and the first data center makes the computing resource available to the client.

The same applies for the following data centers in the routing path. Thus, if the data center to which the access device addresses the request does not have availability of the requested resource, it responds to the access device in order to inform it thereof.

According to one embodiment, when the response indicates that the resource is not available, the response indicating the availability of the computing resource contains the transmitted allocation request.

When the resource is not able to be allocated by a data center and the data center addresses a negative response to the access device, the access device receiving the allocation request that it had transmitted beforehand understands that the allocation request was not able to be accepted by the data center to which it had addressed the request, and retransmits it to the adjacent data center.

According to another embodiment, the response indicating the availability of the computing resource contains a message indicating that the requested computing resource is not available.

According to one feature, when the request has been retransmitted to all of the data centers on the routing path and the response received from all of the data centers indicates that the computing resource is not available, the method comprises sending a failure message to the user terminal.

According to a second aspect, the invention targets a device for managing an allocation request to allocate a computing resource in a cloud computing system, comprising at least two data centers connected to one another via a communication network, the allocation request being sent by a terminal of a user to the communication network via an access device allowing the terminal of the user to access said communication network via an access network and being configured so as to determine a routing path for routing the request to a predefined service address for the cloud computing system.

According to the invention, the management device comprises a transmission module configured so as to:
  transmit the allocation request, received from the terminal of the user, to a first data center; and
  retransmit the allocation request to the adjacent data center, this adjacent data center being the following data center in the routing path, if, according to a response indicating the availability of the computing resource, the computing resource is not available in the first data center, and
  reiterate the transmission of the allocation request to an adjacent data center until either a data center responds that the resource is available or the request has been retransmitted to all of the data centers on the routing path.

According to a third aspect, the invention targets an access device allowing a terminal of a user to access a communication network comprising a management device according to the invention.

It will be noted that the device for accessing the communication network, via which the terminal of the user accesses the cloud computing system, implements the system for managing an allocation request to allocate a computing resource. In other words, the data center that will allocate the computing resource is determined by the infrastructure of the network for accessing the communication network connecting the data centers of the cloud computing system, that is to say independently of the cloud computing system.

According to a fourth aspect, the invention targets a computer program comprising a sequence of instructions for implementing the management method according to the invention when it is loaded and executed by a processor.

Finally, according to a fifth aspect, the invention targets a computer-readable information medium on which there is recorded a computer program comprising a sequence of instructions for implementing the management method according to the invention when it is loaded into and executed by a processor.

The management device, the access device, the computer program and the information medium have features and advantages that are analogous to those described above in relation to the method for managing an allocation request.

Other particular features and advantages of the invention will become more clearly apparent in the following description.

BRIEF DESCRIPTION OF THE DRAWINGS

In the appended drawings, which are given by way of non-limiting examples.

DETAILED DESCRIPTION OF ILLUSTRATIVE EMBODIMENTS

The invention is applicable in cloud computing systems, as they are known. It applies in particular in the context of requests for the, for example, on-demand use of infrastructures offered by a cloud service provider. This service is known as "infrastructure as a service" (IaaS).

The invention however also applies to requests for other types of service, such as "platform as a service" (PaaS) or "software as a service" (SaaS).

Figure 1:
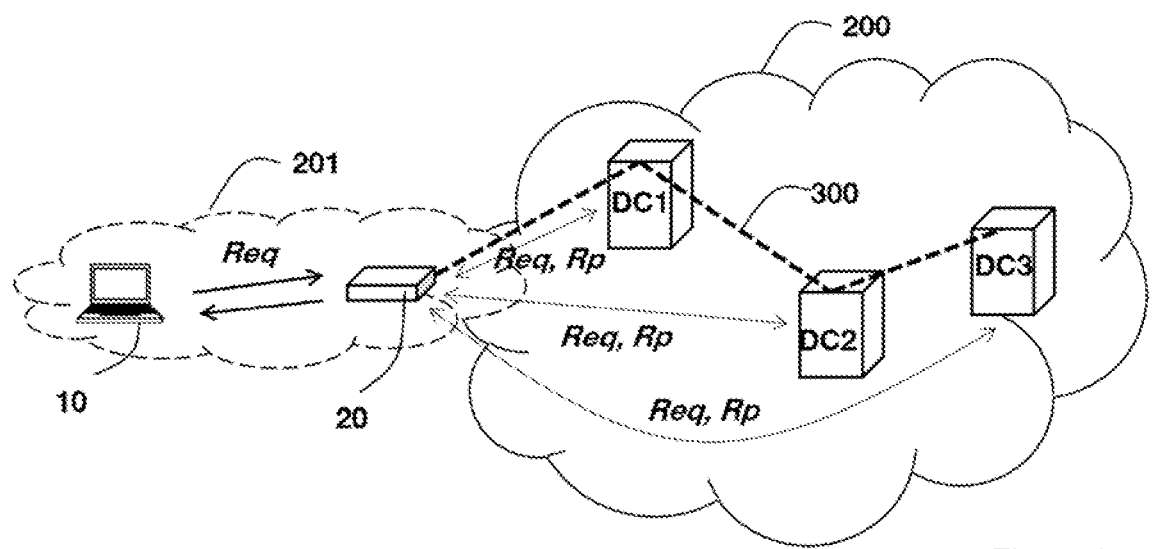
FIG. 1 shows a cloud computing system able to implement the methods according to the invention.

FIG. 1 shows a cloud computing system 1 able to implement the management method according to the invention. The cloud computing system 1 that is shown comprises a plurality of data centers DC, as they are known. In the example that is shown, the cloud computing system 1 comprises three data centers DC1, DC2, DC3. These data centers DC1, DC2, DC3 are connected to one another via a communication network 200 or belong to different communication networks that are connected to one another. In other words, the data centers DC1, DC2, DC3 communicate with one another via one or more communication networks.

A terminal 10 of a user uses the services provided by a cloud computing system 1. To use these services, the user terminal 10 has to generate requests requesting the provision of services and send them to the cloud computing system 1. A request requesting the provision of a service is an allocation request to allocate a computing resource. Allocation request to allocate a computing resource is understood to mean a request via which the terminal 10 of the user requests that a computing resource be allocated thereto in the cloud computing system 1.

When a user subscribes to the services of a service provider, said service provider provides the user with the configuration data necessary for the terminal of the user to be able to access the services made available by the service provider. The user terminal 10 is in particular configured so as to address the requests requesting a service or allocation request to allocate a computing resource in the cloud computing system to what is called a service address. The terminal thus addresses the allocation requests to allocate a computing resource to this service address.

One of the data centers DC1, DC2, DC3 may be responsible for managing the client account of the user. The client account of the user is sometimes managed by an infrastructure independent of the data centers.

The terminal 10 of the user accesses the communication network 200 via an access device 20. The access device 20 allows the terminal 10 of the user to access the communication network 200 via an access network 201. As is known, this access device 20 is configured so as to route the data sent by the user terminal 10 to the communication network 200, in particular to addresses of infrastructures in the communication network.

When the user terminal 10 sends an allocation request to allocate a computing resource, the access device 20, using methods that are conventional and known to a person skilled in the art, establishes the plan or routing path 300 between the user terminal 10 and the service address predefined by the service provider. The routing path 300 contains the addresses of the data centers DC1, DC2, DC3 of the cloud computing system 1 that are used to route the request to the service address.

In accordance with the routing path 300 established by the access device 20, the allocation request sent by the terminal of the user is transmitted to a first data center DC1, then to a second one DC2, and finally to a third one DC3. In the embodiment illustrated, the service address corresponds to the address of the third and last data center DC3.

Of course, this example is purely illustrative, and the number of data centers may be different.

It will be noted that, as is known to a person skilled in the art, the routing path that has been configured in the access device 20 is the optimum path for routing the request to the service address. The first data center for which the request is intended is thus the data center that is located closest to the terminal of the user. In other words, the data centers on the routing path 300 are ordered from closest to the terminal 10 of the user to furthest away.

The terminal 10 of the user may be any type of device configured so as to access a communication network, such as the Internet, via the access device 20. The terminal 10 of the user is typically a computer, a laptop or desktop computer, or a workstation. It may however be a mobile telephone of smartphone type, or another mobile communication terminal, such as a tablet.

The access device 20 is typically a home or residential gateway or a router allowing the terminal 10 of the user to access the communication network 200, such as the Internet. The access network 201 may be a mobile telephony network, a landline telephony network offering access to the Internet of ADSL (for "asymmetric digital subscriber line") type, or a private network of LAN (for "local area network") or WLAN (for "wireless local area network") type.

Figure 2:
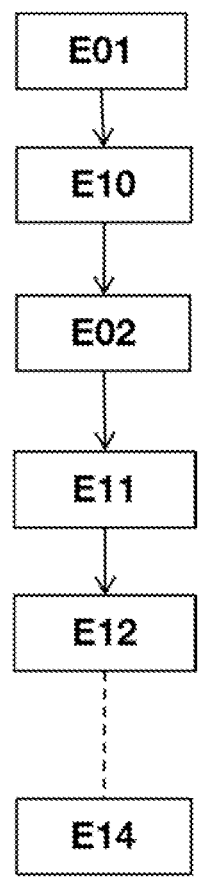
FIG. 2 illustrates steps of a method for managing an allocation request according to one embodiment of the invention.

FIG. 2 illustrates steps of a method for managing an allocation request according to one embodiment of the invention.

The method for managing an allocation request is implemented by the access device 20. It will be noted that the allocation of the computing resource is implemented by a data center DC1, DC2, DC3.

When the access device 20 receives E01 an allocation request Req to allocate a computing resource from the terminal 10 of the user, it transmits E10 the allocation request Req to a first data center DC1. The first data center DC1 is the first data center in the routing path 300 established by the access device 20. In one embodiment, the first data center DC1 is the data center closest to the terminal 10 of the user.

When the first data center DC1 receives the allocation request to allocate the computing resource from the access device 20, it checks the availability of the computing resource. This type of check is known to a person skilled in the art and does not need to be described here.

Depending on the result of the check, the first data center DC1 allocates the computing resource and/or sends a response indicating the availability of said resource to the access device 20. In particular, when, according to the result of the check, the computing resource is available in the first data center DC1, the computing resource is allocated.

When, according to the result of said check, the computing resource is not available, the data center sends the access device 20 a response telling it that the computing resource is not available. In one embodiment, this response contains the allocation request transmitted beforehand by the access device 20.

If the access device 20 receives E02 a response from the first data center indicating that the computing resource is not available in the first data center DC1, it retransmits E11 the allocation request to the following data center in the routing path 300. In the embodiment that is shown, the following data center is the second data center DC2, that is to say the following data center receiving the request along the routing path 300 established by the access device 20 in order to reach the service address.

The second data center DC2 implements the same operations as the first data center, that is to say it checks whether the computing resource requested by the user is available, in which case it allocates the resource. If the computing resource is not available there, it informs the access device, and this retransmits the request to the following data center, that is to say the third data center DC3. The third data center implements the same operations as the first and the second data center, such that either the computing resource is allocated by the third data center DC3 or the allocation request is retransmitted by the access device to the following data center, and so on, until a data center has the availability to allocate the computing resource requested by the user terminal, or all of the data centers in the routing path have been asked, in order to check whether it is able to allocate the requested computing resource.

It will be noted that, when all of the data centers in the routing path have been asked, the last data center DC3 in the routing path 300 or data center furthest from the terminal of the user has been asked.

The management method thus retransmits the allocation request to the following data center DC1, DC2, DC3 in said routing path 300, until either the computing resource is available in a data center DC1, DC2, DC3 or the request has been retransmitted E11, E12, E13 to the data center DC3 furthest from the user terminal, or to all of the data centers DC1, DC2, DC3.

In another embodiment, not shown, if, according to the response indicating the availability, the computing resource is not available in a data center, the allocation request is furthermore retransmitted by the data center to the adjacent data center.

In this embodiment, the allocation request is transmitted to the following data center by the access device and also by the additional data center. This constitutes redundant means for transmitting the allocation request.

If the computing resource is not available in any of the additional data centers DC1, DC2, DC3, the access device 20 addresses an error message to the user terminal 10. This message contains information representing the failure of the allocation request to allocate the computing resource.

The messages exchanged between the access device and the data centers and between the access device and the communication terminal are in accordance with communication protocols such as those used by the Internet.

Figure 3:
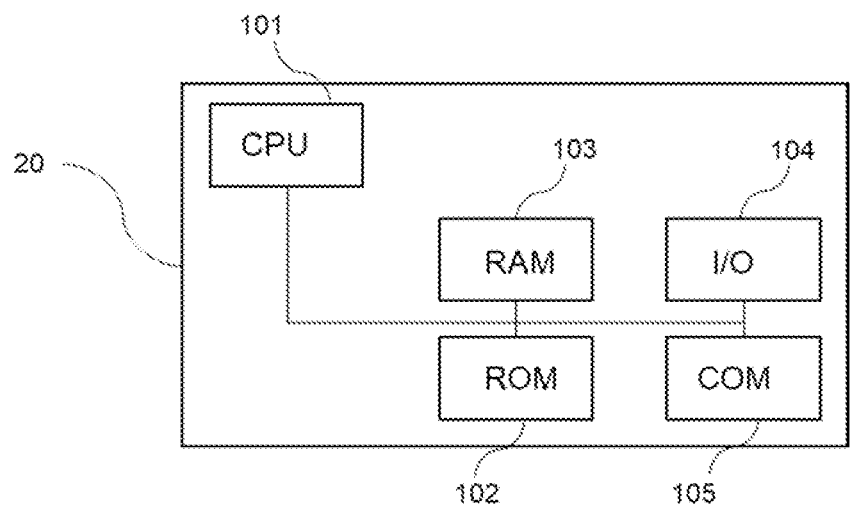
FIG. 3 illustrates a hardware architecture able to implement the management method according to the invention.

FIG. 3 schematically illustrates a hardware architecture of a management device able to implement the management method according to the invention.

In one embodiment, the management device is embedded or integrated in the access device 20.

The management device 20 comprises a communication bus 100 to which the following are connected:
- a processing unit 101, called CPU (for "central processing unit") in the figure and possibly comprising one or more processors;
- a non-volatile memory 102, for example a ROM (for "read-only memory"), an EEPROM (for "electrically erasable programmable read-only memory") or a flash memory;
- a random access memory 103 or RAM;
- an input/output interface 104, called I/O in the figure, for example keys or buttons, a screen, a keypad, a mouse or another pointing device such as a touchscreen or a remote controller allowing a user to interact with the access device 20 via a graphical interface or a human-machine interface; and
- a communication interface 105, called COM in the figure, designed to exchange data for example with a data center DC1, DC2, DC3 via a communication network 200.

The random access memory 103 contains registers designed to record variables and parameters that are created and modified during the execution of a computer program comprising instructions for implementing the management method according to the invention. The instruction codes of the program stored in the non-volatile memory 102 are loaded into the RAM memory 103 in order to be executed by the processing unit CPU 101.

The non-volatile memory 102 is for example a rewritable EEPROM memory or flash memory able to constitute a medium within the meaning of the invention, that is to say able to comprise a computer program comprising instructions for implementing the management method according to the invention. The rewritable memory may comprise the routing path 300 for routing the allocation request to the service address or parameters providing the service address.

This program, by way of its instructions, defines functional modules of the management device that are implemented and/or control the hardware elements described above. These modules comprise in particular a transmission module configured so as to:
- transmit (E10) the allocation request (Req), received from the terminal (10) of the user, to a first data center (DC1), the first data center (DC1) being the first one in the determined routing path (300); and
- retransmit (E11) the allocation request (Req) to the adjacent data center (DC2), this adjacent data center being the following data center in the routing path (300), if, according to a response (Rp) indicating the availability of the computing resource, the computing resource is not available in the first data center (DC1), and
- reiterate the transmission (E12) of the allocation request to an adjacent data center (DC3) until either a data center responds that the resource is available or the request (Req) has been retransmitted to all of the data centers (DC1, DC2, DC3) on the routing path (300).

The abovementioned modules and means are driven by the processor of the processing unit 101. They may take the form of a program able to be executed by a processor, or a hardware form, such as an application-specific integrated circuit (ASIC), a system on chip (SoC), or a programmable logic circuit-type electronic component, such as an FPGA (for "field-programmable gate array") component.

Each data center DC1, DC2, DC3 has a hardware architecture similar to the one described for the management device, and will not be described.

In particular, each data center comprises:
- a checking module configured so as to check, upon receiving said allocation request, the availability of the computing resource,
- an allocation module configured so as to allocate said computing resource, when said computing resource is available, and
- a response module configured so as to send a response indicating the availability of said resource to the access device.

The terminal 10 of the user also comprises a communication bus to which there are connected a processing unit or microprocessor, a non-volatile memory, a random access memory or RAM, and a communication interface designed in particular to exchange data with the access device 20.

Figure 4:
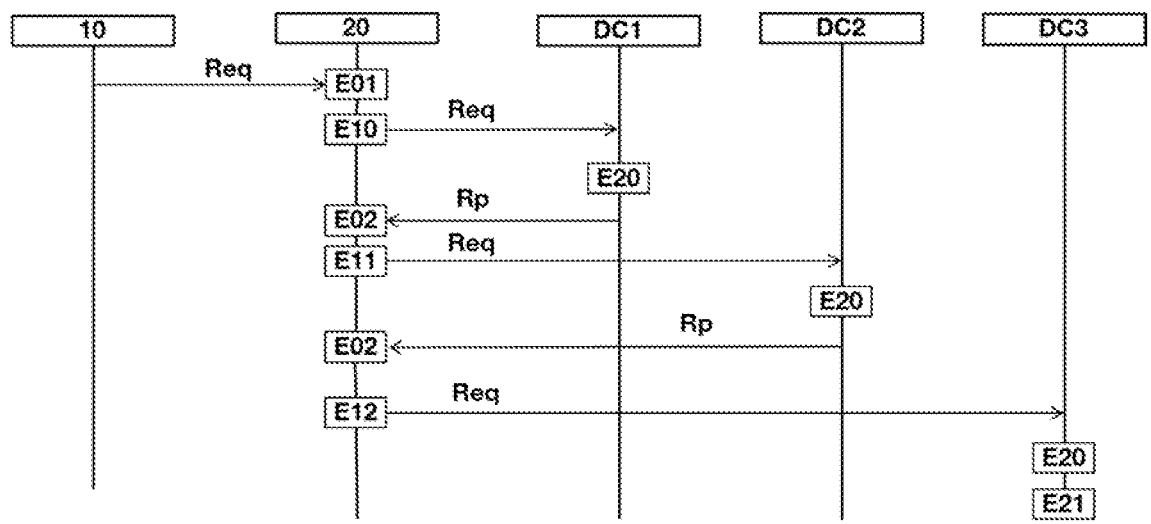
FIG. 4 illustrates exchanges between entities of the system according to one exemplary implementation of the method for managing an allocation request.

FIG. 4 illustrates one example of exchanges between the terminal 10 of the user, the access device 20 and data centers DC1, DC2, DC3.

In the example that is shown, the third data center DC3 has the availability to allocate the computing resource requested by the user.

Of course, this example is given purely by way of illustration, the exchanges being different in different examples.

In this example, the user terminal 10 sends an allocation request Req to allocate a resource, this request Req being received E01 by the access device 20. The access device 20 addresses it E10 to the first data center DC1. This receives the request Req and checks the availability of the computing resource. Since the computing resource is not available, the data center DC1 responds to the access device 20. Said access device 20 receives E03 the response and retransmits E11 the request Req to the second data center DC2.

The second data center DC2 receives the request Req and checks the availability of the computing resource E20. Since the computing resource is not available, the data center DC2 responds to the access device 20. Said access device 20 receives E03 the response and retransmits E11 the request Req to the third data center DC3.

The third data center DC3 receives the request Req and checks the availability of the computing resource E20. Since the computing resource is available, the third data center DC3 allocates E21 the computing resource.

The user is thus able to use the requested computing resource, which is allocated in a data center selected by the access device 20 of his access provider for accessing the communication network 200, such as the Internet.

Although the present disclosure has been described with reference to one or more examples, workers skilled in the art will recognize that changes may be made in form and detail without departing from the scope of the disclosure and/or the appended claims.

The invention claimed is:

1. A management method comprising:
managing an allocation request to allocate a computing resource in a cloud computing system, said request being sent by a terminal of a user, the cloud computing system comprising at least two data centers connected to one another via a communication network, said management method being implemented by a home or residential gateway allowing the terminal of the user to access said communication network via an access network and being configured so as to determine a routing path for routing the request to a predefined service address for the cloud computing system, wherein said management method comprises:

transmitting said allocation request, received from the terminal of the user, to a first data center;

receiving a response indicating availability of the computing resource; and in response to the computing resource being not available in the first data center, retransmitting said allocation request to an adjacent data center, this adjacent data center being a following data center in the routing path, the retransmission of the allocation request to an adjacent data center being reiterated until either a data center on the routing path of the at least two data centers responds that the computing resource is available or the request has been retransmitted to all of the data centers on the routing path.

2. The management method as claimed in claim 1, wherein said first data center is the first data center in the determined routing path.

3. The management method as claimed in claim 1, wherein, when the received response indicates that the resource is not available, the response contains said transmitted or retransmitted allocation request.

4. The management method as claimed in claim 1, wherein, when the received response indicates that the resource is not available, the response contains a message indicating that the requested computing resource is not available.

5. The management method as claimed in claim 1, wherein the method further comprises, in response to the request having been retransmitted to all of the data centers on the routing path and the response received from all of the data centers indicates that the computing resource is not available, sending a failure message to the user terminal.

6. A management device comprised in a home or residential gateway for managing an allocation request to allocate a computing resource in a cloud computing system, the cloud computing system comprising at least two data centers connected to one another via a communication network, the allocation request being sent by a terminal of a user to the communication network via said management device allowing the terminal of the user to access said communication network via an access network and being configured so as to determine a routing path for routing the request to a predefined service address for the cloud computing system, wherein said management device comprises:

a processor; and a non-transitory computer-readable medium comprising instructions stored thereon which when executed by the processor configure the management device to:

transmit the allocation request, received from the terminal of the user, to a first data center; and receive a response indicating availability of the computing resource; and retransmit the allocation request to an adjacent data center, this adjacent data center being a following data center in the routing path, in response to the computing resource being not available in the first data center (DC1), and reiterate the transmission of the allocation request to an adjacent data center on the routing path until either a data center on the routing path responds that the resource is available or the request has been retransmitted to all of the data centers on the routing path.

7. A non-transitory computer-readable information medium on which there is recorded a computer program comprising a sequence of instructions for implementing a management method when the instructions are loaded into and executed by a processor of a management device comprised in a home or residential gateway, the management method managing an allocation request to allocate a computing resource in a cloud computing system, said request being sent by a terminal of a user, the cloud computing system comprising at least two data centers connected to one another via a communication network, said management method being implemented by said management device comprised in a home or residential gateway allowing the terminal of the user to access said communication network via an access network and being configured so as to determine a routing path for routing the request to a predefined service address for the cloud computing system, wherein said instructions configure the management device to:

transmit said allocation request, received from the terminal of the user, to a first data center;

receive a response indicating availability of the computing resource; and in response to the computing resource being not available in the first data center, retransmit said allocation request to an adjacent data center, this adjacent data center being a following data center in the routing path, the retransmission of the allocation request to an adjacent data center being reiterated until either a data center on the routing path of the at least two data centers responds that the computing resource is available or the request has been retransmitted to all of the data centers on the routing path.

* * * * *